United States Patent
Sapozhnikov et al.

(10) Patent No.: US 10,468,055 B1
(45) Date of Patent: Nov. 5, 2019

(54) MULTI-SENSOR READER HAVING OPPOSITELY BIASED SENSING LAYERS

(71) Applicant: Seagate Technology LLC, Cupertino, CA (US)

(72) Inventors: Victor Sapozhnikov, Minnetonka, MN (US); Mohammed Shariat Ullah Patwari, Edina, MN (US); Scott Wilson Stokes, Brooklyn Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/800,846

(22) Filed: Nov. 1, 2017

(51) Int. Cl.
  *G11B 5/39* (2006.01)
  *G11B 5/11* (2006.01)

(52) U.S. Cl.
  CPC .............. *G11B 5/3932* (2013.01); *G11B 5/11* (2013.01); *G11B 5/112* (2013.01); *G11B 5/3912* (2013.01); *G11B 5/3951* (2013.01); *G11B 2005/3996* (2013.01)

(58) Field of Classification Search
  None
  See application file for complete search history.

(56) References Cited

U.S. PATENT DOCUMENTS

| | | | |
|---|---|---|---|
| 5,751,521 A * | 5/1998 | Gill | G11B 5/3906 360/314 |
| 8,824,106 B1 | 9/2014 | Garfunkel et al. | |
| 9,230,578 B2 | 1/2016 | Batra et al. | |
| 9,324,342 B2 | 4/2016 | Sapozhnikov et al. | |
| 9,396,745 B2 | 7/2016 | Macken et al. | |
| 9,401,163 B2 | 7/2016 | McKinlay et al. | |
| 9,406,321 B2 | 8/2016 | Kief et al. | |
| 9,431,031 B1 | 8/2016 | Xiao et al. | |
| 9,536,549 B1 | 1/2017 | Ge et al. | |
| 9,552,834 B1 | 1/2017 | Sapozhnikov et al. | |
| 9,659,586 B1 | 5/2017 | Sapozhnikov et al. | |
| 9,685,177 B2 | 6/2017 | Ge et al. | |
| 2001/0040782 A1 * | 11/2001 | Ju et al. | G11B 5/3903 360/327.3 |
| 2004/0057162 A1 * | 3/2004 | Gill | G11B 5/3903 360/314 |
| 2005/0068683 A1 * | 3/2005 | Gill | G11B 5/3932 360/314 |
| 2007/0217089 A1 * | 9/2007 | Singh | G11B 5/3945 360/327.31 |
| 2011/0279923 A1 * | 11/2011 | Miyauchi et al. | G11B 5/3912 360/319 |

(Continued)

*Primary Examiner* — Craig A. Renner
(74) *Attorney, Agent, or Firm* — Westman, Champlin & Koehler, P.A.

(57) ABSTRACT

A multi-sensor reader includes first and second read sensors. The first read sensor includes a first sensor stack including a sensing layer having a magnetization that changes according to an external magnetic field, and a first biasing component configured to magnetically bias the sensing layer of the first sensor stack in a first direction. The second read sensor includes a second sensor stack including a sensing layer having a magnetization that changes according to an external magnetic field, and a second biasing component configured to magnetically bias the sensing layer of the second sensor stack in a second direction that is substantially opposite the first direction.

20 Claims, 7 Drawing Sheets (56) References Cited

U.S. PATENT DOCUMENTS

| | | | |
|---|---|---|---|
| 2012/0225322 A1* | 9/2012 | Han et al. | G11B 5/3954 428/815 |
| 2012/0281319 A1* | 11/2012 | Singleton et al. | G11B 5/3932 360/319 |
| 2015/0062735 A1 | 3/2015 | Sapozhnikov et al. | |
| 2017/0243604 A1* | 8/2017 | Sugawara et al. | G11B 5/3954 |

\* cited by examiner

MULTI-SENSOR READER HAVING OPPOSITELY BIASED SENSING LAYERS

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

SUMMARY

Embodiments of the present disclosure relate to a multi-sensor reader and a method of forming a multi-sensor reader. One embodiment of the multi-sensor reader includes first and second read sensors. The first read sensor includes a first sensor stack including a sensing layer having a magnetization that changes according to an external magnetic field, and a first biasing component configured to magnetically bias the sensing layer of the first sensor stack in a first direction. The second read sensor includes a second sensor stack including a sensing layer having a magnetization that changes according to an external magnetic field, and a second biasing component configured to magnetically bias the sensing layer of the second sensor stack in a second direction that is substantially opposite the first direction.

Another embodiment of the multi-sensor reader includes first and second read sensors. The first read sensor includes a first sensor stack including a sensing layer having a magnetization that changes according to an external magnetic field, and a first biasing component configured to magnetically bias the sensing layer of the first sensor stack in a first direction. The first biasing component includes a first magnetic structure comprising a shield pinned layer having a magnetization that is pinned by an antiferromagnetic layer. The second read sensor comprises a second sensor stack including a sensing layer having a magnetization that changes according to an external magnetic field, and a second biasing component configured to magnetically bias the sensing layer of the second sensor stack in a second direction that is substantially opposite the first direction. The second biasing component includes a second magnetic structure comprising antiferromagnetically coupled magnetic layers.

In one embodiment of the method of forming a multi-sensor reader a first read sensor is formed by forming a first sensor stack including a sensing layer having a magnetization that changes according to an external magnetic field, and a first biasing component configured to magnetically bias the sensing layer of the first sensor stack in a first direction. The first biasing component includes a first magnetic structure comprising a shield pinned layer having a magnetization that is pinned by an antiferromagnetic layer. A second read sensor is formed by forming a second sensor stack including a sensing layer having a magnetization that changes according to an external magnetic field, and a second biasing component configured to magnetically bias the sensing layer of the second sensor stack in a second direction that is substantially opposite the first direction. The second biasing component includes a second SAF structure comprising at least one more antiferromagnetically coupled magnetic layer than the first SAF structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
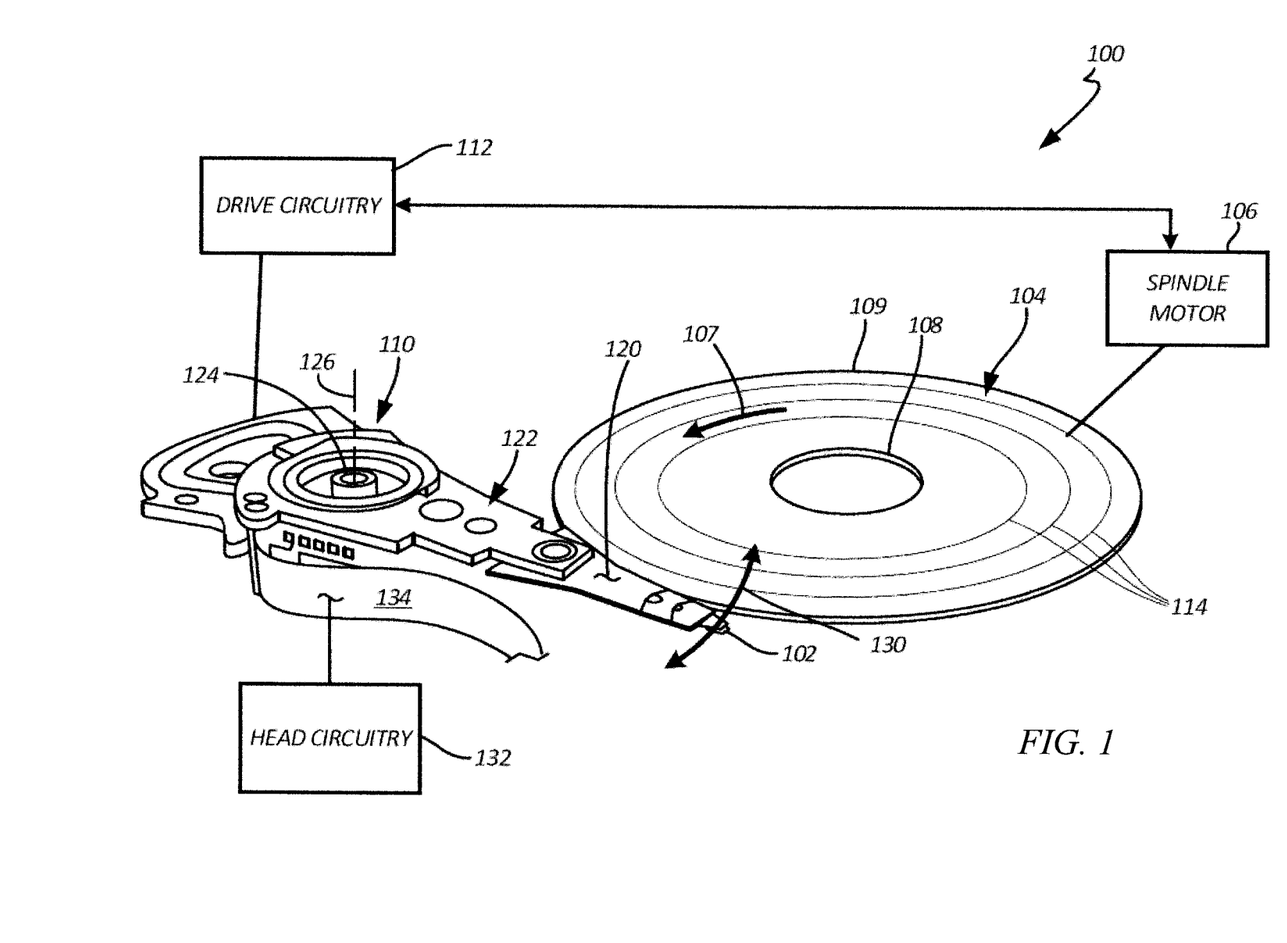
FIG. 1 is a schematic illustration of an exemplary data storage device, in accordance with embodiments of the present disclosure.

FIG. 1 is a schematic illustration of an exemplary data storage device 100 including a data storage medium and a head for reading data from and/or writing data to the data storage medium. The data storage device 100 represents an exemplary operating environment, in which embodiments of the present disclosure may be practiced. Embodiments of the present disclosure may also be practiced in different types of operating environments.

In the data storage device 100, a head 102 is positioned above a storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104, as illustrated by arrow 107, and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown).

The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross-track direction as illustrated by arrow 130.

The head 102 includes one or more transducer elements (not shown in FIG. 1) coupled to head circuitry 132 through flex circuit 134. The transducer elements of the head 102, described in greater detail below with reference to FIG. 2, facilitate data read operations, in which data is read from the tracks 114, and data write operations, in which data is written to the tracks 114. These data read and write operations may be performed using conventional techniques.

Figure 2:
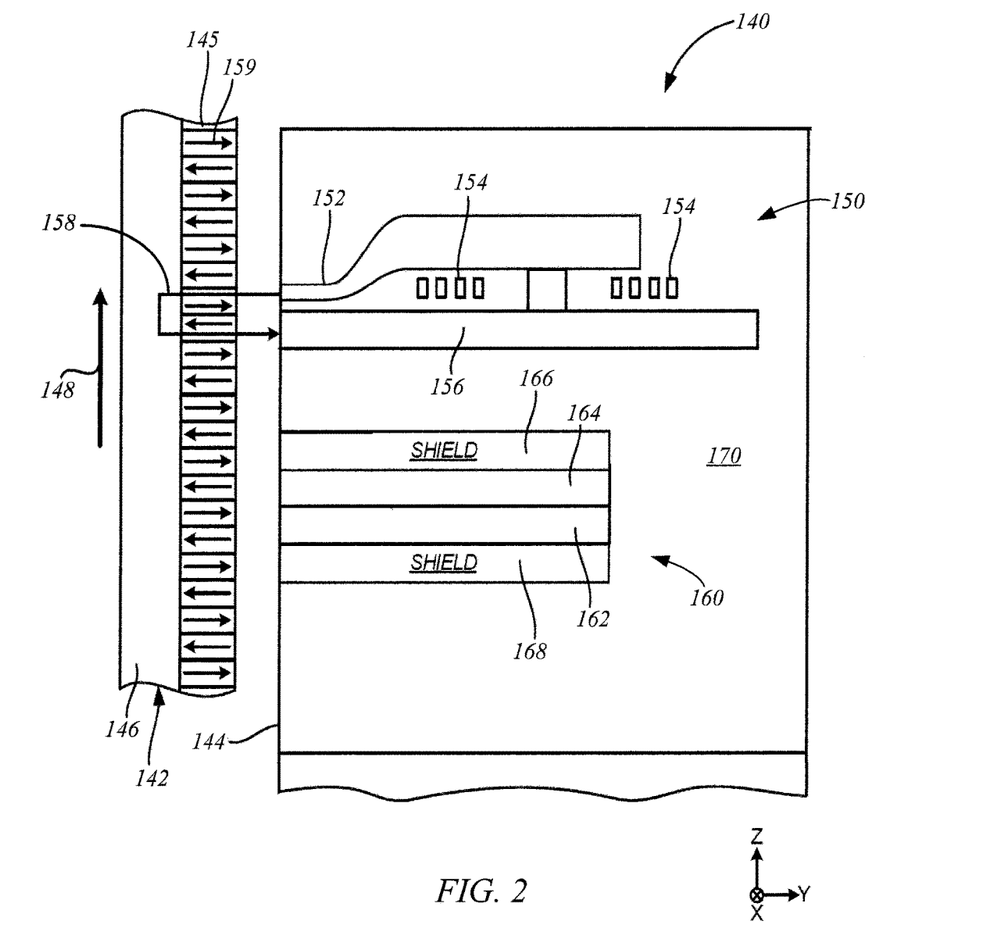
FIG. 2 is a schematic cross-sectional view of an exemplary recording head and data storage medium, in accordance with embodiments of the present disclosure.

FIG. 2 is a schematic cross-sectional view of portions of an exemplary recording head 140 and a data storage medium 142 taken along a plane substantially normal to a plane of a bearing surface (for example, an air bearing surface (ABS)) 144 of recording head 140. The recording head elements shown in FIG. 2 may be included in a recording head, such as recording head 102 shown in FIG. 1.

The medium 142 is illustratively a data storage medium, such as medium 104 in FIG. 1. The storage medium 142 includes a recording layer 145 and an underlayer 146. The storage medium 142 rotates in the direction shown by arrow 148, which generally corresponds to arrow 107 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

In some embodiments, the recording head 140 includes a write transducer 150, which may include a write pole 152, a magnetization coil 154, and a return pole 156. During an exemplary write operation, an electric current is passed through the coil 154 to generate a magnetic field, which is represented by arrow 158. The magnetic field 158 passes from the write pole 152 through the recording layer 145, into the underlayer 146, and across to the return pole 156. The magnetic field 158 illustratively records a magnetization pattern 159 in the recording layer 145.

In some embodiments, the recording head 140 includes a multi-sensor reader 160 that includes a plurality of read sensors, such as read sensors 162 and 164, which are used to sense or detect the magnetization patterns 159 in the recording layer 145 to retrieve information (e.g., data bits) represented by the magnetization patterns or bit patterns 159. In some embodiments, the read sensors 162 and 164 are positioned between a top shield 166 and a bottom shield 168 within and a wafer overcoat 170. The top and bottom shields 166 and 168, which may be made of a material having high magnetic permeability, reduce or substantially block extraneous magnetic fields, such as, for example, those from bits patterns 159 from adjacent tracks on the medium 142 from impacting the read sensors 162 and 164, thus improving the performance of the reader 160. In one implementation, the top and bottom shields 166 and 168 permit magnetic fields from the bit pattern 159 directly under the read sensors 162 and 164 to affect the corresponding read sensor and allow the bit to be read.

The multiple read sensors of the reader 160 address challenges posed by greater data density requirements and faster data transfer speeds. It should be noted that while only two read sensors 162 and 164 are shown in FIG. 2 in the interest of simplification, in different multi-sensor reader embodiments, any suitable number of read sensors may be employed. In some embodiments, the read sensors (e.g. 162 and 164) of the reader 160 are stacked along a track direction (i.e., along a z-axis in FIG. 2). However, in accordance with different multi-sensor reader embodiments, the read sensors may be stacked along a track width direction that is perpendicular to the track direction (i.e., a cross-track direction, which is along an x-axis in FIG. 2). A y-axis, which is perpendicular to the x-axis and the z-axis, is aligned in a stripe-height direction.

Figure 3:
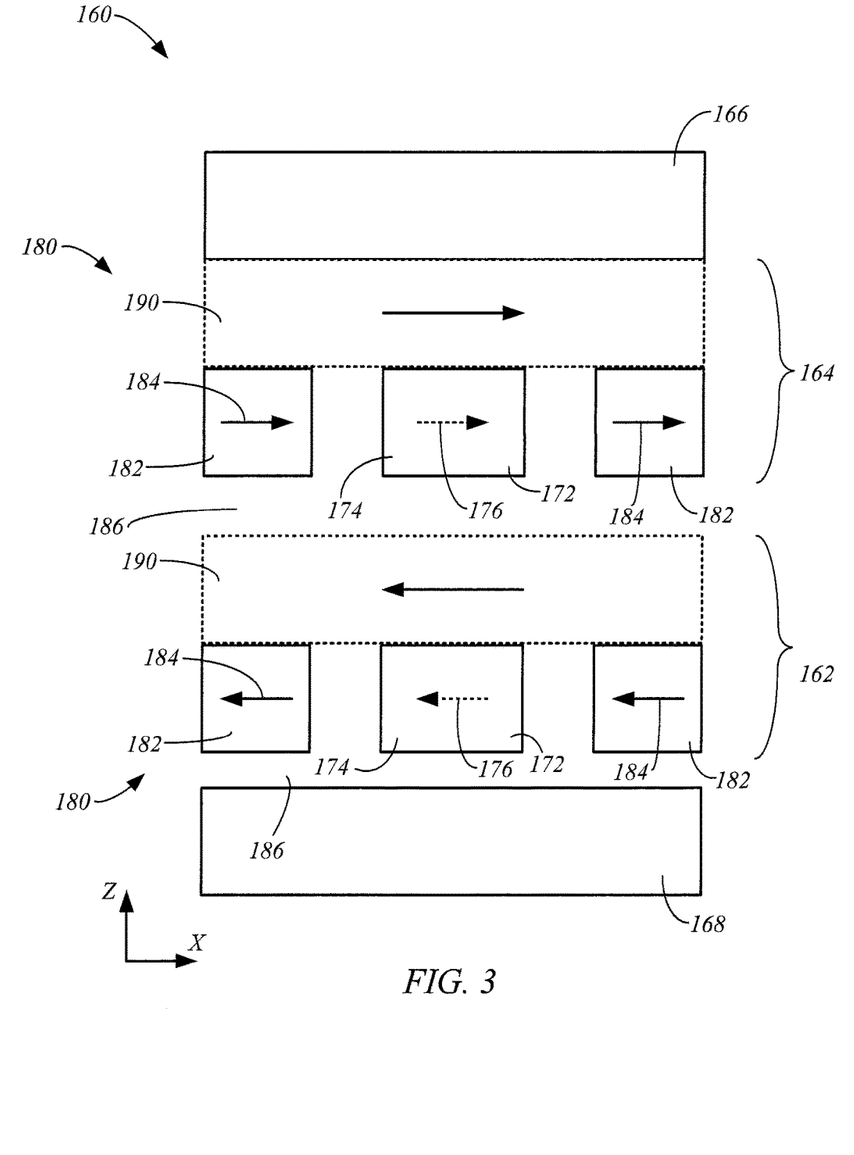
FIG. 3 is a schematic block diagram of a bearing surface view of an exemplary multi-sensor reader, in accordance with embodiments of the present disclosure.

FIG. 3 is a schematic block diagram illustrating a bearing surface view of an exemplary multi-sensor reader 160 including read sensors 162 and 164, which are positioned between top and bottom shields 166 and 168, in accordance with embodiments of the present disclosure. Each of the read sensors 162 and 164 includes a magnetoresistive sensor stack 172. The magnetoresistive sensor stack 172 includes a plurality of layers including a free layer or sensing layer 174. Only the free layer 174 is shown to simplify the drawing. Additional layers of the sensor stack 172 will be described in greater detail below. In one implementation, the free or sensing layer 174 is not exchange coupled to, for example, an antiferromagnet. As a result, the magnetic moment of the free layer 174, which is represented by arrow 176 is free to rotate under the influence of an applied magnetic field in a range of interest.

In some embodiments, each of the read sensors 162 and 164 includes a biasing component 180. Each biasing component 180 includes side biasing components 182, such as magnets or side shields, which produce a magnetic field that biases the free layer 174 with a magnetic moment parallel to the plane of the figure and generally oriented horizontally, as indicated by arrows 184. This bias prevents the magnetic moment 176 of the free layer 174 from drifting due to, for example, thermal energy, which may introduce noise into the data sensed by the reader 160. However, the bias is sufficiently small to allow the magnetic moment 184 of the free layer 174 to change in response to an applied magnetic field, such as a magnetic field of a data bit stored on the data discs. In some embodiments, the side biasing components 182 are formed of soft magnetic material (e.g., material that can be easily magnetized and demagnetized at relatively low magnetic fields). The soft magnetic material may be an alloy comprising Ni and Fe, for example. The magnetoresistive sensor stack 172 is separated and electrically isolated from the side biasing components 182 by an isolation layer 186 that includes an electrically insulative material. The isolation layer 186 may also be present in other regions of the reader 160.

In some embodiments, each biasing component 180 may optionally include a shield structure 190 (shown in phantom lines) that is configured to stabilize the magnetization of the corresponding side biasing components 182, such as when they are formed using soft side shields. Embodiments of the shield structures 190 are described in greater detail below.

Embodiments of the present disclosure address issues with neighboring track interference, which can result in readback errors and lower areal density capability. FIGS. 4A-D are simplified side views of an exemplary read sensor 200 having a magnetoresistive stack 172 illustrating the effects of interfering magnetic fields of neighboring tracks of a magnetic storage medium 142 on the free or sensing layer 174, which is magnetically biased in a bias direction 202 produced by the biasing component. The biasing component and other components of the exemplary read sensor 200 are not shown in order to simplify the drawings.

In the drawings, the sensor stack 172 is positioned above a main data track 208 for a reading operation. The main track 208 is positioned between neighboring data tracks 210A and 210B. A bit being read from the main track 208 applies a main field torque on the free layer 174, which is indicated by arrow 212. The main field torque 212 changes the magnetic moment 176 of the free layer 174, which has a quiescent state that is generally oriented in the bias direction 202. The main field torque 212 drives the magnetic moment 176 of the free layer 174 upward for a bit having a positive polarity (FIGS. 4A and 4C), and pulls the magnetic moment 176 downward for a bit having a negative polarity (FIGS. 4B and 4D).

The neighboring tracks 210A and 210B each apply a neighboring field torque on the free layer 174, which are indicated by arrows 214A and 214B. These neighboring field torques are strongest when the angle between the neighboring field torque and the magnetic moment 176 of the free layer 174 is close to 90 degrees, and weakest when the angle is close to 0 degrees. Accordingly, when the biasing component biases the magnetic moment 176 of the free layer 174 in a left-to-right direction, interference is mostly generated from the right track 210B when the bit in the central track 208 has a positive polarity, as indicated by arrow 214B in FIG. 4A, and from the left track 210A when the bit in the central track 208 has a negative polarity, as indicated by arrow 214A in FIG. 4B. This is reversed when the biasing component biases the magnetic moment of the free layer 174 in a right-to-left direction. Thus, interference is mostly generated from the left track 210A when the bit in the central track 208 has a positive polarity, as indicated by arrow 214A in FIG. 4C, and from the right track 210B when the bit in the central track 208 has a negative polarity, as indicated by arrow 214B in FIG. 4D.

In some embodiments, the multi-sensor reader 160 includes read sensors 162 and 164 having free or sensing layers 174 having magnetic moments 176 that are biased in opposing directions by the corresponding biasing component 180, as shown in FIG. 3. This provides advantages over readers having read sensors whose free layers are biased in the same direction including, for example, reduced interference from neighboring tracks, resulting in lower bit error rates, and higher areal density capabilities.

Figure 4A:
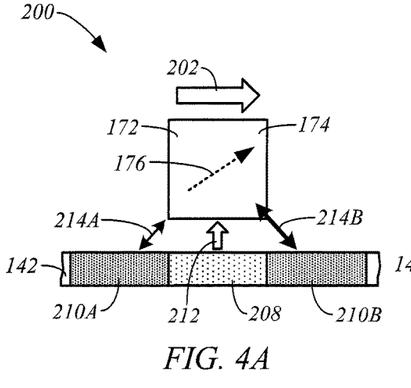
FIGS. 4A-D are simplified side views of an exemplary read sensor illustrating the effects of interfering magnetic fields of neighboring tracks of a magnetic storage medium on a sensing layer of a magnetoresistive stack.
Figure 4B:
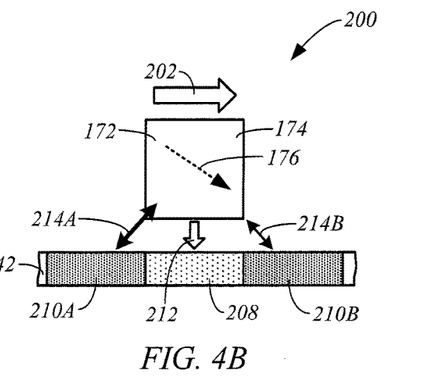
Figure 4C:
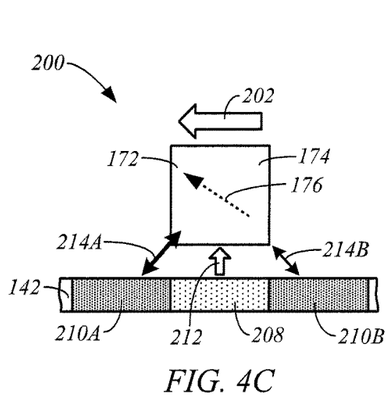
Figure 4D:
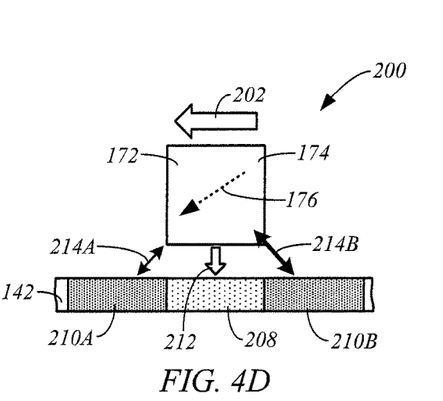

For example, if the read sensors 162 and 164 shown in FIG. 3 included free layers 174 that were biased in the same direction, such as each having the configuration of the exemplary reader 200 shown in FIG. 4A, the readback signals S1 and S2 from the readers 162 and 164 may be symbolically written as provided in Equations 1 and 2. In the equations, S represents the clean signal from the central track 208 only, and L and R are interference signals respectively from the left and right neighboring tracks 210A and 210B. The weaker signal produced by one of the neighboring tracks (e.g., interference signal 214A from left track 210A in FIG. 4A) is neglected.

$$S1 = S + R + L = S + R \quad \text{Eq. 1}$$

$$S2 = S + R + L = S + R \quad \text{Eq. 2}$$

Since both readers 162 and 164 read the same neighboring track interference simultaneously, we get:

$$S1 + S2 = 2S + 2R \quad \text{Eq. 3}$$

The magnitude of the interference signal (2R) is reduced when the free layers 174 of the read sensors 162 and 164 of the reader 160 are biased in opposing directions, as shown in FIG. 3. For example, reader 162 may be represented by the reader 200 of FIG. 4A, and reader 164 may be represented by the reader 200 of FIG. 4C, for reading a bit in the main track 208 having a positive polarity. In this case, the readback signals S1 and S2 from the readers 162 and 164, respectively, may be symbolically written as provided in Equations 4 and 5. Again, the weaker signal produced by one of the neighboring tracks (e.g., left track 210A in FIG. 4A and right track 210B in FIG. 4C) is neglected.

$$S1 = S + R + L = S + R \quad \text{Eq. 4}$$

$$S2 = S + R + L = S + L \quad \text{Eq. 5}$$

Due to the L and R signals being uncorrelated and statistically equal in magnitude, we find:

$$S1 + S2 = 2S + \sqrt{(L^2 + R^2)} = 2S + L\sqrt{2} \quad \text{Eq. 6}$$

As a result, by biasing the free or sensing layers 174 of the readers 162 and 164 in opposite directions, neighboring track interference may be reduced by the square root of 2 over the arrangement in which the free or sensing layers 174 of the readers 162 and 164 are both biased in the same direction. Accordingly, biasing the free layers 174 of the stacked readers 162 and 164 in opposite directions reduces the interference effects from neighboring tracks, which results in a reduction in bit error rates, and an increase in the areal density capability of the reader 160.

Figure 5:
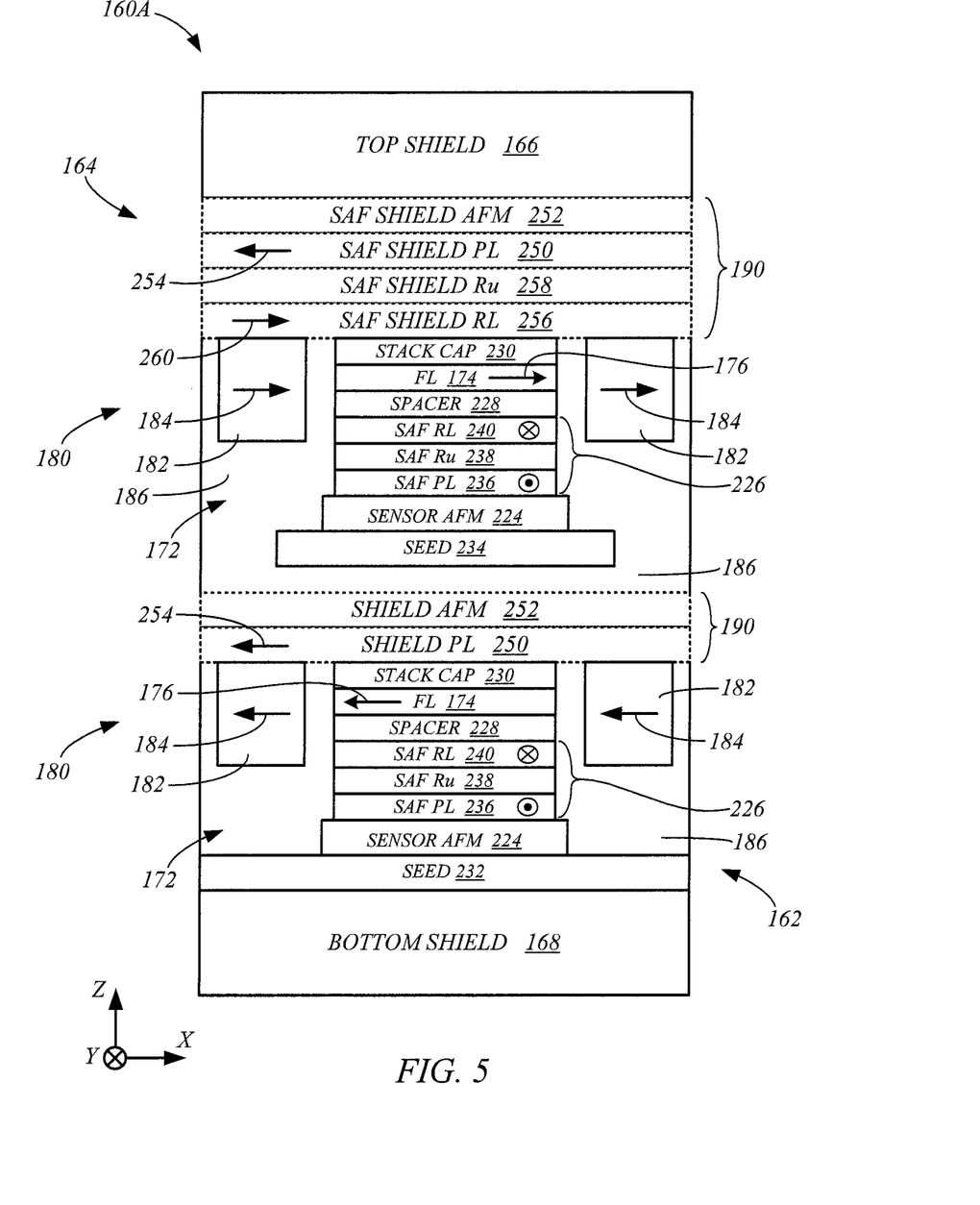
FIGS. 5 and 6 are simplified diagrams of a bearing surface view of exemplary multi-sensor readers, in accordance with embodiments of the present disclosure.

FIG. 5 is a simplified diagram of a bearing surface view of an exemplary multi-sensor reader 160A, in accordance with embodiments of the present disclosure. The multi-sensor reader 160A includes the read sensors 162 and 164, each including the sensor stack 172, and the biasing component 180, as discussed above with regard to FIG. 3.

In addition to the free layer 174, embodiments of each sensor stack 172 may also include a sensor antiferromagnetic (AFM) layer 224, a sensor stack synthetic antiferromagnetic (SAF) structure 226, a spacer layer 228, and/or a stack cap 230. The magnetoresistive sensor stack 172 of the read sensor 162 may also include a seed layer 232 between the bottom shield 168 and the AFM layer 224. The sensor stack 172 of the read sensor 164 may include a seed layer 234 between the sensor stack 172 and the corresponding optional shield structure 190 (shown in phantom lines). The shield structures 190 for the sensor stacks 172 may each be positioned above the corresponding stack cap 230.

In the embodiment shown in FIG. 5, the sensor SAF structure 226 includes a pinned layer 236, a thin separation layer 238, which may comprise a metal such as ruthenium (Ru) in some embodiments, and a reference layer 240. The magnetic moments of each of the pinned layer 236 and the reference layer 240 are not allowed to rotate under magnetic fields in the range of interest (for example, magnetic fields generated by the bits of data stored on the data discs). The magnetic moments of the reference layer 240 and the pinned layer 236 are generally oriented normal to the plane (i.e., y-axis direction) of FIG. 5 and are anti-parallel to each other.

In some embodiments, the sensor stacks 172 may utilize tunnel magnetoresistance (TMR) or giant magnetoresistance (GMR) effects. In embodiments that utilize TMR effects, spacer layer 228 is a tunneling barrier layer that separates the SAF structure 226 from the free layer 174. The tunneling barrier layer 228 is sufficiently thin that quantum mechanical electron tunneling occurs between the reference layer 240 in the SAF structure 226 and the free layer 174. The electron tunneling is electron-spin dependent, making the magnetic response of the magnetoresistive sensor stack 172 a function of the relative orientations and spin polarizations of the SAF structure 226 and the free layer 174. The highest probability of electron tunneling occurs when the magnetic moments of the SAF structure 226 and the free layer 174 are parallel, and the lowest probability of electron tunneling occurs when the magnetic moments of the SAF structure 226 and the free layer 174 are antiparallel. Accordingly, the electrical resistance of each of the magnetoresistive sensor stacks 172 changes in response to an applied magnetic field. The data bits of the pattern 159 (FIG. 2) on the medium 142 may be magnetized in a direction normal to the bearing surface 144 (FIG. 2) or in the plane of FIG. 5, either toward the bearing surface 144 and into the plane of FIG. 5, or away from the bearing surface 144 and out of the plane of FIG. 5. Thus, when the magnetoresistive sensor stack 172 passes over a data bit, the magnetic moment of the free layer 174 is rotated as discussed with reference to FIGS. 4A-D, either away from the bearing surface 144 (e.g., into the plane of FIG. 5), or toward the bearing surface 144 (e.g., out of the plane of FIG. 5), changing the electrical resistance of the magnetoresistive sensor stack 172. The value of the bit being sensed by the magnetoresistive sensor stack 172 (for example, either 1 or 0) may therefore be determined based on the current flowing through the sensor stack 172, such as between two electrodes (not shown) connected to the magnetoresistive sensor stack 172.

Some embodiments of the optional shield structure 190 (shown in phantom lines) of the biasing components 180 include one or more magnetic layers that operate to provide a relatively fixed magnetization to assist in stabilizing the magnetizations 184 of the corresponding side shields 182 in opposing directions, such as when the side shields 182 are formed of a soft magnetic material. In some embodiments, the structure 190 of the read sensor 162 includes at least one soft ferromagnetic layer that is pinned by an antiferromagnetic layer, and the structure 190 of the read sensor 164 includes antiferromagnetically coupled magnetic layers.

In some embodiments, the structure 190 of the read sensor 162 include a shield pinned layer 250 and a shield AFM layer 252. The AFM layer 252 pins the magnetization of the shield pinned layer 250 substantially parallel to the bearing surface, as indicated by the arrows 254. In one exemplary embodiment, the pinned layer 250 is the sole soft ferromagnetic layer of the structure 190 of the read sensor 162, and operates to stabilize the magnetizations 184 of the corresponding side shields 182 substantially parallel to the bearing surface, as shown in FIG. 5. Thus, in some embodiments, the structure 190 of the read sensor 162 does not include an antiferromagnetically coupled magnetic layer.

In some embodiments, the shield structure 190 of the read sensor 164 includes a SAF shield pinned layer 250 and a SAF shield AFM layer 252 to pin the magnetization of the SAF shield pinned layer 250 substantially parallel to the bearing surface, as indicated by the arrow 254. Additionally, the structure 190 of the read sensor 164 includes a SAF shield reference layer 256 and a thin SAF shield separation layer 258, which may comprise a metal such as Ru in some embodiments. The pinning of the magnetization of the SAF shield pinned layer 250 by the SAF shield AFM layer 252 results in the relatively fixed magnetization of the SAF shield reference layer 256 in the direction indicated by arrow 260, due to antiferromagnetic coupling across the SAF shield separation layer 258. This stabilizes the magnetizations 184 of the side shields 182 of the read sensor 164 substantially parallel to the bearing surface in a direction that is opposite that of the magnetizations 184 of the side shields 182 of the read sensor 162, as shown in FIG. 5. Thus, the sensing layer 174 of the read sensor 164 is magnetically biased in the indicated direction, which is opposite that of the sensing layer 174 of the read sensor 162.

The shield pinned layers 250 and the SAF shield reference layer 256 may be formed of a soft magnetic material (for example, an alloy comprising Ni and Fe). Also, if the side shields 182 are stabilized by shape anisotropy, by employing hard magnetic layers adjacent to the soft magnetic layers within side shields 182, or by any other suitable technique, the structures 190 may be eliminated from the sensors 162 and 164.

Figure 6:
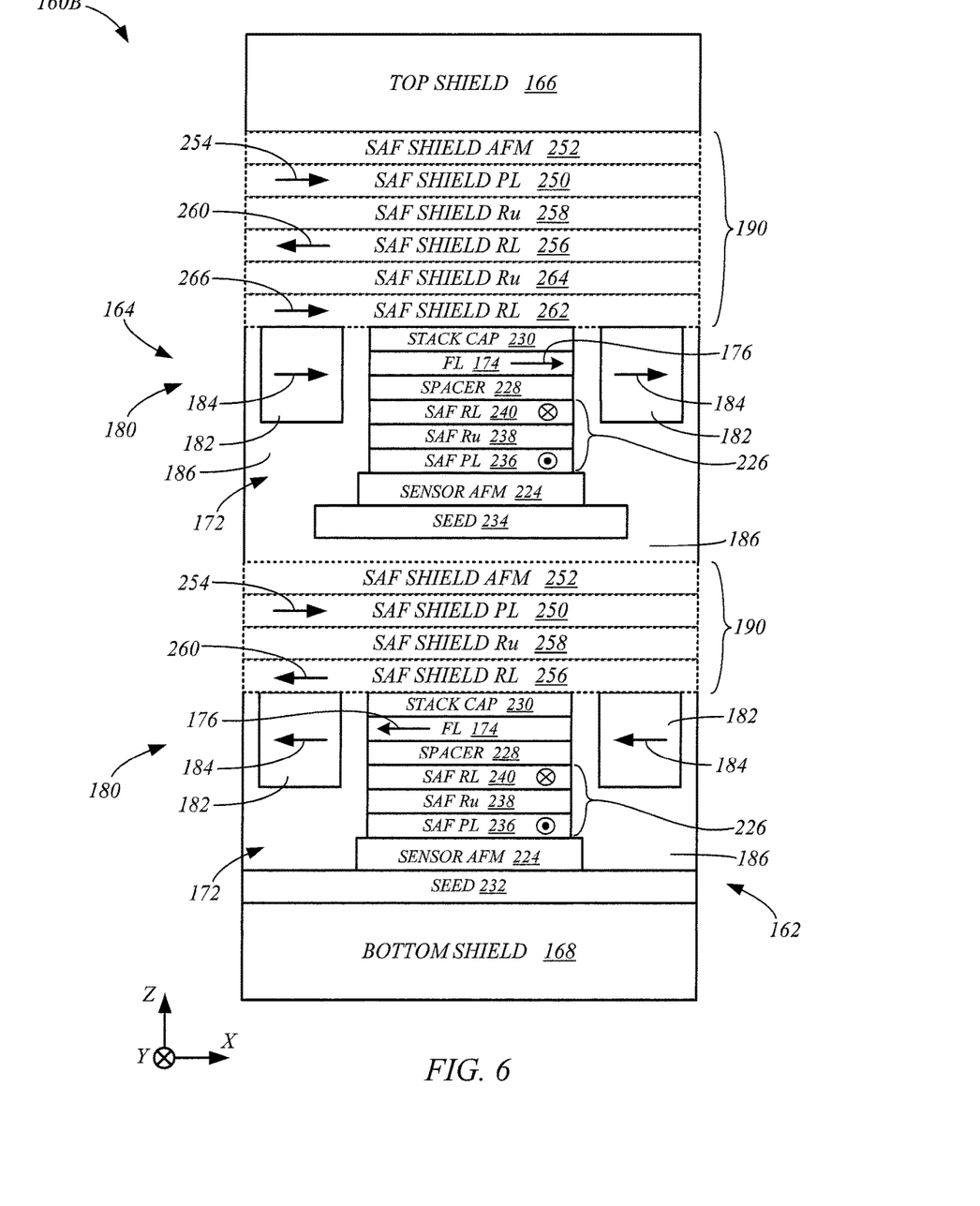

FIG. 6 is a simplified diagram of a bearing surface view of an exemplary multi-sensor reader 160B, in accordance with embodiments of the present disclosure. The multi-sensor reader 160B generally differs from the reader 160A of FIG. 5 in the configuration of the optional shield structure 190 (shown in phantom lines) for the read sensors 162 and 164. The read sensor 162 generally includes the structure 190 of the read sensor 164 of the reader 160A, and operates to magnetically bias the magnetizations 184 of the side shields 182 and the magnetic moment 176 of the free or sensing layer 174, in the direction indicated in FIG. 6. Accordingly, the structure 190 of the biasing component 180 of the read sensor 162 includes the SAF shield pinned layer 250, the SAF shield AFM layer 252, the SAF shield reference layer 256, and the thin SAF shield separation layer 258. The separation layer 258 may comprise a metal, such as Ru, in some embodiments. The AFM layer 252 pins the magnetization of the SAF shield pinned layer 250 substantially parallel to the bearing surface, as indicated by the arrow 254. This results in the relatively fixed magnetization of the SAF shield reference layer 256 in the direction indicated by the arrow 260, due to antiferromagnetic coupling across the SAF shield separation layer 258. The shield structure 190 of the read sensor 162 stabilizes the magnetization 184 of the side shields 182, and magnetically biases the sensing layer 174 of the corresponding sensor stack 172 in the indicated directions.

In some embodiments, the shield structure 190 of the read sensor 164 differs from the shield structure 190 of the read sensor 162 by including at least one additional antiferromagnetically coupled layer. For example, the shield structure 190 of the read sensor 164 may include an additional SAF shield reference layer 262, and a SAF shield separation layer 264, as shown in FIG. 6. The magnetization 266 of the SAF shield reference layer 262 is relatively fixed through antiferromagnetic coupling across the SAF shield separation layer 264. The shield structure 190 of the read sensor 164 stabilizes the magnetization 184 of the side shields 182, and magnetically biases the sensing layer 174 of the corresponding sensor stack 172 in the indicated directions, which are opposite those of the read sensor 162.

One alternative to the embodiments described above with reference to FIGS. 5 and 6, is to use magnetic structures 190 that utilize AFM layers 252 having different blocking temperatures. Accordingly, the magnetizations of the AFM layers 252 having the different blocking temperatures may be set at different temperatures during annealing processes. This allows the AFM layer 252 of the magnetic structure 190 for the read sensor 162 to have an opposing magnetization than that of the AFM layer 252 of the magnetic structure 190 for the read sensor 164. Thus, in this case, the magnetic structures 190 may be formed substantially identically while biasing the side shields 182 in opposing directions.

Figure 7:
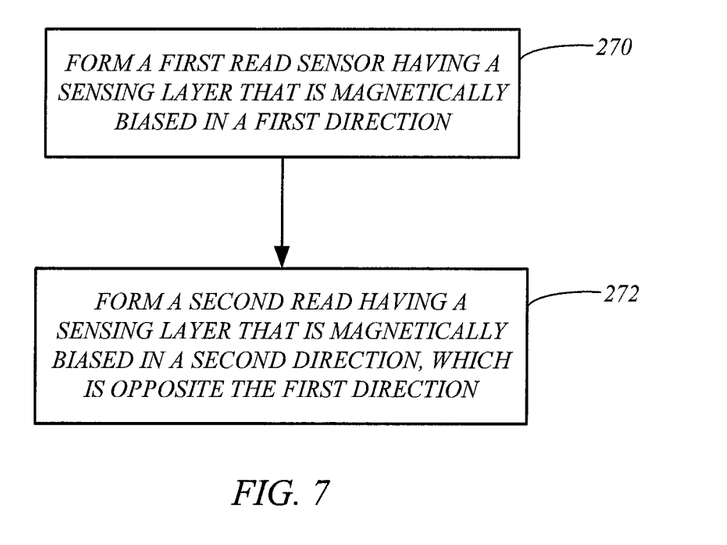
FIG. 7 is a flowchart illustrating a method of forming a multi-sensor reader, in accordance with embodiments of the present disclosure.

FIG. 7 is a flowchart illustrating a method of forming a multi-sensor reader, such as reader 160A or 160B, in accordance with embodiments of the present disclosure. At 270, a first read sensor 162 is formed having a sensing layer 174 that is magnetically biased in a first direction. In some embodiments of step 270, a bottom shield 168 is formed and a bottom seed layer 232 is formed on the bottom shield 168, as shown in FIGS. 5 and 6.

In some embodiments of step 270, a sensor stack 172 is formed including the sensing layer 174 having a magnetization 176 that changes according to an external magnetic field, and a biasing component 180 is formed that magnetically biases the magnetization 176 of the sensing layer 174 in the first direction, such as indicated in FIGS. 3, 5 and 6. In some embodiments, the biasing component 180 of the first read sensor 162 includes a shield structure 190 that includes at least one soft ferromagnetic layer that is pinned by an antiferromagnetic layer, and the structure 190 of the read sensor 164 includes antiferromagnetically coupled magnetic layers, shown in FIG. 5, for example.

At 272 of the method, a second read sensor 164 is formed having a sensing layer 174 having a magnetization 176 that is biased in a second direction, which is opposite the first direction. In some embodiments of step 272, an isolation layer, such as isolation layer 186 (FIGS. 3, 5 and 6), is provided or formed above the read sensor 162, such as above the sensor stack 172 of the read sensor 162. A SAF seed structure, such as seed structure 234 (FIGS. 5 and 6) may be formed over the isolation layer.

In some embodiments of step 272, a sensor stack 172 is formed including the sensing layer 174 having a magnetization 176 that changes according to an external magnetic field, and a biasing component 180 is formed that magnetically biases the sensing layer 174 in the second direction, such as indicated in FIGS. 3, 5 and 6. In some embodiments, the biasing component 180 of the second read sensor 164 includes a shield structure 190 that includes at least one more antiferromagnetically coupled magnetic layer than the shield structure 190 of the first read sensor 162, such as the SAF shield reference layer 262, shown in FIG. 6, for example.

It is understood by those skilled in the related art that any suitable deposition techniques may be used to form the different layers of the read sensors 162 and 164 in the method steps of FIG. 7. Additionally, it is also noted that the multi-sensor readers described herein may include several additional layers formed between, above, and/or below the layers forming the read sensors 162 and 164.

Although various examples of a multi-reader sensor having sensing layers that are biased in opposite directions are disclosed in the application, embodiments are not limited to the particular examples. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. In addition, although the embodiments described herein are directed to a particular type of multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. An apparatus comprising:
   a first read sensor comprising:
      a first sensor stack comprising a sensing layer having a magnetization that changes according to an external magnetic field; and
      a first biasing component configured to magnetically bias the sensing layer of the first sensor stack in a first direction;
   a second read sensor comprising:
      a second sensor stack comprising a sensing layer having a magnetization that changes according to an external magnetic field; and
      a second biasing component configured to magnetically bias the sensing layer of the second sensor stack in a second direction that is substantially opposite the first direction;
   a shield between the first read sensor and the second read sensor; and
   head circuitry configured to provide a single readback signal that is a sum of a first readback signal produced by the first read sensor and a second readback signal produced by the second read sensor.

2. The apparatus of claim 1, wherein a number of separation layers in the second biasing component is greater than a number of separation layers in the first biasing component.

3. The apparatus of claim 2, wherein the second biasing component comprises one separation layer and the first biasing component comprises no separation layers.

4. The apparatus of claim 3, wherein the second biasing component comprises a ruthenium separation layer.

5. The apparatus of claim 1, wherein:
   the first biasing component includes a first magnetic structure comprising a shield pinned layer having a magnetization that is pinned by an antiferromagnetic layer; and
   the second biasing component includes a second magnetic structure comprising antiferromagnetically coupled magnetic layers.

6. The apparatus of claim 5, wherein the magnetization of the shield pinned layer is relatively fixed in the first direction by the antiferromagnetic layer.

7. The apparatus of claim 6, wherein the second magnetic structure includes a synthetic antiferromagnet (SAF) structure comprising:
   a SAF shield pinned layer having a relatively fixed magnetization in the first direction; and
   a first SAF shield reference layer between the second sensor stack and the SAF shield pinned layer of the SAF structure and having a relatively fixed magnetization in the second direction.

8. The apparatus of claim 1, wherein the first sensor stack is substantially in stacked alignment with the second sensor stack along a vertical axis, and the first sensor stack is stacked over the second sensor stack.

9. The apparatus of claim 1, wherein the first sensor stack is substantially in stacked alignment with the second sensor stack along a vertical axis, and the second sensor stack is stacked over the first sensor stack.

10. The apparatus of claim 1, wherein:
   the first sensor stack is substantially in stacked alignment with the second sensor stack along a vertical axis; and
   the apparatus comprises:
      a pair of first side biasing components configured to bias the sensing layer of the first sensor stack in the first direction, the first side biasing components positioned on opposing sides of the first sensor stack and displaced from each other along a horizontal axis that is perpendicular to the vertical axis; and
      a pair of second side biasing components configured to bias the sensing layer of the second sensor stack in the second direction, the second side biasing components positioned on opposing sides of the second sensor stack and displaced from each other along the horizontal axis.

11. An apparatus comprising:
a first read sensor comprising:
 a first sensor stack including a sensing layer having a magnetization that changes according to an external magnetic field; and
 a first biasing component configured to magnetically bias the sensing layer of the first sensor stack in a first direction, the first biasing component including a first magnetic structure comprising a shield pinned layer having a magnetization that is pinned by an antiferromagnetic layer;
a second read sensor comprising:
 a second sensor stack including a sensing layer having a magnetization that changes according to an external magnetic field; and
 a second biasing component configured to magnetically bias the sensing layer of the second sensor stack in a second direction that is substantially opposite the first direction, the second biasing component including a second magnetic structure comprising antiferromagnetically coupled magnetic layers;
a shield between the first read sensor and the second read sensor; and
head circuitry configured to provide a single readback signal that is a sum of a first readback signal produced by the first read sensor and a second readback signal produced by the second read sensor.

12. The apparatus of claim 11, wherein the magnetization of the shield pinned layer is relatively fixed in the first direction by the antiferromagnetic layer.

13. The apparatus of claim 12, wherein the second magnetic structure includes a synthetic antiferromagnet (SAF) structure comprising:
 a SAF shield pinned layer having a relatively fixed magnetization in the first direction; and
 a first SAF shield reference layer between the second sensor stack and the SAF shield pinned layer of the SAF structure and having a relatively fixed magnetization in the second direction.

14. The apparatus of claim 11, wherein a number of separation layers in the second biasing component is greater than a number of separation layers in the first biasing component.

15. The apparatus of claim 14, wherein the second biasing component comprises one separation layer and the first biasing component comprises no separation layers.

16. The apparatus of claim 11, wherein the first sensor stack is substantially in stacked alignment with the second sensor stack along a vertical axis, and the first sensor stack is stacked over the second sensor stack.

17. The apparatus of claim 11, wherein the first sensor stack is substantially in stacked alignment with the second sensor stack along a vertical axis, and the second sensor stack is stacked over the first sensor stack.

18. The apparatus of claim 11, wherein:
the first sensor stack is substantially in stacked alignment with the second sensor stack along a vertical axis; and
the apparatus comprises:
 a pair of first side biasing components configured to bias the sensing layer of the first sensor stack in the first direction, the first side biasing components positioned on opposing sides of the first sensor stack and displaced from each other along a horizontal axis that is perpendicular to the vertical axis; and
 a pair of second side biasing components configured to bias the sensing layer of the second sensor stack in the second direction, the second side biasing components positioned on opposing sides of the second sensor stack and displaced from each other along the horizontal axis.

19. A method of forming a device including a multi-sensor reader comprising:
forming a first read sensor comprising:
 forming a first sensor stack including a sensing layer having a magnetization that changes according to an external magnetic field; and
 forming a first biasing component configured to magnetically bias the sensing layer of the first sensor stack in a first direction; and
forming a second read sensor comprising:
 forming a second sensor stack including sensing layer having a magnetization changes according to an external magnetic field; and
 forming a second biasing component configured to magnetically bias the sensing layer of the second sensor stack in a second direction that is substantially opposite the first direction;
forming a shield between the first read sensor and the second read sensor; and
coupling head circuitry to the first and second read sensors, the head circuitry being configured to provide a single readback signal that is a sum of a first readback signal produced by the first read sensor and a second readback signal produced by the second read sensor.

20. The method of claim 19, wherein a number of separation layers in the second biasing component is greater than a number of separation layers in the first biasing component.

* * * * *